(12) United States Patent
Ivanov

(10) Patent No.: US 11,434,847 B2
(45) Date of Patent: Sep. 6, 2022

(54) MULTI-NOZZLE JET PROPULSOR

(71) Applicant: Vladimir E. Ivanov, Moscow (RU)

(72) Inventor: Vladimir E. Ivanov, Moscow (RU)

( * ) Notice: Subject to any disclaimer, the term of this patent is extended or adjusted under 35 U.S.C. 154(b) by 128 days.

(21) Appl. No.: 16/645,483

(22) PCT Filed: Feb. 20, 2019

(86) PCT No.: PCT/RU2019/000106
§ 371 (c)(1),
(2) Date: Mar. 8, 2020

(87) PCT Pub. No.: WO2019/172808
PCT Pub. Date: Sep. 12, 2019

(65) Prior Publication Data
US 2020/0400097 A1    Dec. 24, 2020

(30) Foreign Application Priority Data

Mar. 6, 2018    (RU) .......................... RU2018108167

(51) Int. Cl.
| *F02K 1/15* | (2006.01) |
| *F02K 1/80* | (2006.01) |
| *B63H 11/08* | (2006.01) |
| *B63H 11/10* | (2006.01) |
| *B63H 25/46* | (2006.01) |
| *B63H 11/107* | (2006.01) |

(52) U.S. Cl.
CPC .............. *F02K 1/15* (2013.01); *B63H 11/08* (2013.01); *B63H 11/107* (2013.01); *B63H 25/46* (2013.01); *F02K 1/80* (2013.01)

(58) Field of Classification Search
CPC ..... F02K 1/00; F02K 1/15; F02K 1/80; B63H 11/00; B63H 11/02; B63H 11/04; B63H 11/08; B63H 11/103; B63H 11/107; B63H 25/00; B63H 25/46
USPC ....................................... 440/40, 38; 114/151
See application file for complete search history.

(56) References Cited

U.S. PATENT DOCUMENTS

| 2,330,674 | A | * | 9/1943 | Briggs | .................. | B63H 25/46 |
| | | | | | | 114/151 |
| 3,675,611 | A | * | 7/1972 | Glass | ..................... | B63H 25/46 |
| | | | | | | 114/151 |
| 6,325,683 | B1 | * | 12/2001 | Yocom | .................. | B63H 11/08 |
| | | | | | | 114/151 |
| 9,205,904 | B2 | * | 12/2015 | Asada | ................. | B63H 11/103 |

\* cited by examiner

*Primary Examiner* — Lars A Olson
(74) *Attorney, Agent, or Firm* — Patentagar PLLC; Alexander Rabinovich

(57) ABSTRACT

The invention is a jet propulsor using gas or liquid of the environment as an operating medium (OM). The propulsor comprises eight nozzles arranged centrally symmetrically and a channel system (CS). The CS comprises eight active channels (AC) with pressure units therein to control a flow head of the OM, four intermediate channels (IC) and a central channel (CC). Each of the AC is connected by one end to one of the nozzles. All AC are pairwise connected to each other by other ends, forming four connecting nodes of the AC (ACCN). Connected to each of the ACCN by one end is one of the IC pairwise interconnected by other ends and forming two connecting nodes of the IC (ICCN). The CC is connected to the ICCN. The technical result is the reduction of unproductive energy loss in the flows of the OM in the CS and increasing its efficacy.

1 Claim, 6 Drawing Sheets

MULTI-NOZZLE JET PROPULSOR

The invention relates to jet propulsors.

STATE OF THE ART

Jet propulsors have been known for long and used in various transport vehicles. In these propulsors, thrust emerges as a response to the discharge of a gas or liquid jet into the environment. In that case, the gas/liquid denotes in common practice an operating medium of a propulsor. In its direction, the emerging thrust is in opposition to the jet direction.

Among known jet propulsors, a group of propulsors can be singled out which use gas or liquid of the medium in which they move (are located). Through intake apertures, those propulsors suck in the gas or liquid from the medium they are in, and then this gas or liquid, having passed through canals of the propulsor and pressure units, is discharged through a nozzle (or nozzles) back into the medium as a jet. The resulting reaction load is a propulsor thrust. For example, outer air or water can serve as the operating medium. This kind of propulsors comprises the pressure units within fluid channels where the operating medium moves. It is this class of propulsors that the present one falls in.

ANALOGS OF THE INVENTION

Water-jet propulsors used in some vessels and submarines are remote analogs of the invention. Outside water is used as an operating medium in water-jet propulsors of such vessels. Pressure units contained in those propulsors provide for sucking in the outer water through intake units and discharging same through nozzles thus creating a reactive thrust. The nozzles in such propulsors are generally deflectable (rotatable) which allows controlling the jet discharge direction and, thus, controlling the direction of thrust and thrust moment of the propulsor (controlling thrust vector) and turning the vessel. However, the above water-jet propulsors fail to provide reversal of the operating medium flow in the fluid channels of the propulsor and do not provide controlling the direction of the thrust vector and thrust moment vector omnidirectionally (in the full solid angle range) with regard to the propulsor itself.

A closer analog is a fore maneuvering unit disclosed in British patent application GB1389532A published Apr. 3, 1975. The unit provides the reversal of the operating medium flows in the propulsor channels and allows—with limited efficacy—for changing the propulsor thrust direction in the solid angle range limited by a hemisphere. The design of the maneuvering unit set forth in the application makes it potentially possible, by means of a specific control system modification, undisclosed in the application, to allow controlling the thrust vector direction aggregated for all nozzles of the maneuvering unit. It does not make it possible, however, to achieve controlling the thrust moment of the unit (not required therefor).

The Closest Analog (Prototype)

The closest analog (prototype) of the present invention is the propulsor with eight nozzles connected by flow channels into a spatial multibeam star disclosed in the Russian patent RU2431583 published Oct. 20, 2011, and Canadian patent CA2838700 published Mar. 15, 2016. The features of the prototype (of the closest version in said patents), somewhat similar to those in the present invention, are eight nozzles equipped with deflectors and connected to each other by a system of channels, with press units in the channels. The prototype, as well as the present invention provides simultaneous and independent controlling thrust and thrust moment vectors in the range of a full solid angle.

The proposed propulsor, as well as the prototype, is a multi-nozzle (octa-nozzle) jet propulsor using gas or liquid of the environment as an operating medium, and, as the prototype, is intended for simultaneous and independent generating and controlling thrust (thrust vector) and thrust moment (thrust moment vector) spatially omnidirectionally (i.e. in the full solid angle range). It is similarly uses nozzles with deflectors of discharged (ejected) jet, the nozzles being connected to each other through a system of flow channels.

The intended use, applicability of, and need for, the present propulsor are supposed to be similar to those of the prototype. In other words, the propulsor is intended for equipping transport vehicles moving in a 3D medium, a liquid (for example, in a water body) or a gas one (for example, in the air) and for providing, simultaneously and independently, thrust in any spatial direction (within a full solid angle) and thrust moment in any spatial direction (a rotary force around an axis arbitrarily spaced relative to the propulsor itself). Submarine ships and dirigibles are non-limiting examples of such vehicles.

Unlike the prototype, whose system of fluid channels is configured as a simple spatial star (further on referred to as a simple star) where each of the propulsor channels is connected by one of the ends thereof to a central chamber, the channel system of the present propulsor is somewhat more complex and comprises a central channel, four intermediate channels connected in twos to each of the ends of the central channel, and eight active (end) channels connected in twos to other ends of the intermediate channels (the structure further on referred to as a complex branched star). Each of the eight active channels is connected by another end thereof to one of eight nozzles of the propulsor and is equipped by controllable reversal pressure units.

The technical problem the present propulsor is intended to solve is increasing the operational efficacy of a propulsor of this kind. It is achieved due to lowering hydrodynamic (gas-dynamic) energy loss in operating medium flows in the fluid channels of the present propulsor, to which the complex branched star new channel system contributes. The simple star system of the prototype is unable to attain this efficacy.

The technical result provided by the present invention lies in lowering hydrodynamic (gas-dynamic) waste energy loss in operating medium flows in the fluid channels of the present propulsor and increasing the efficacy thereof due to that. The increasing of the efficacy becomes evident in the improving of the efficiency thereof, the enhancing of the working power, thrust and thrust moment as compared with the prototype, all other conditions being equal.

Also, the proposed propulsor structure diversifies designs for propulsors of this kind, i.e. expands the range of jet propulsors.

Explanation of the Terms Used

Conventional terms "transport vehicle", "transfer mechanism", "transportation facility" are perceived and used further in the specification as equivalents for the purposes of this application.

Environment (medium) is a homogeneous space filled with a gas or a liquid, in which the transportation facility is present and/or moves.

Meant by the term "nozzle" further in the text is any apparatus or unit, as well as an end of a propulsor channel, open into space and through which discharge of the operating medium from the propulsor into the space is performed.

Meant by the term "an apparatus for controlling the direction of the jet discharge from the nozzle" is any conventional, and intended therefor, apparatus. Non-limiting examples of the apparatus can include controllable deflectors (sets of controllable and parallel plates) or deflectable or bendable elbows, or even more complex multicomponent apparatus for jet deflection.

Meant by the term "channel" of the propulsor is any unit or a combination of several units, which in aggregation form a tunnel and secure flowing of the operating medium inside the propulsor.

Meant by the term "a pressure unit in the channel" or "a controllable pressure unit" is a single apparatus or a unit, as well as a system of apparatuses or units. Such a unit is supposed to be: (a) equipped with some power actuator, (b) able to control the pressure generated by this unit in an operating medium flow in the channel, and (c) able to reverse the direction in which the pressure is generated.

The terms "hydrodynamic resistance" and "gas-dynamic resistance" in this application have the coinciding meaning, because of the conventional assumption that, for the case of a substantially subsonic speed, a movement of a gas in an unclosed space, as it takes place with the present propulsor, is considerably similar to that of a light liquid.

Meant in the application by the terms "propulsor thrust vector" and "propulsor summary thrust vector" is a vector sum of all propulsor nozzle thrust vectors.

Meant by the term "nozzle thrust vector" is a thrust (reaction load) generated upon discharging a jet of the operating medium from a nozzle and directed to the side opposite to the direction of discharging the jet.

Meant by the terms "propulsor thrust moment vector" and "propulsor summary thrust moment vector" in the application is a vector sum of thrust moments (turning forces) generated by nozzles and aiming at turning the propulsor around spatial axes, for example, around the rolling, pitch, and vertical axes. Each nozzle generates a nonzero thrust moment whenever the direction of the nozzle thrust vector does not pass through the mass center point of the transport vehicle, a part of which the propulsor is.

Meant by the term "nozzle thrust moment vector" in the application is a common for physics and technology definition of this vector unit as a vectorial product of a radius vector drawn from the mass center to the location of the nozzle by the nozzle thrust vector.

Also meant throughout the application is that always assumed in the description of the propulsor operation is a subsonic speed of the movement of the operating medium relative to propulsor structure elements. The propulsor is intended to operate at subsonic speeds.

DISCLOSURE OF THE ESSENCE OF THE INVENTION

The invention features a multi-nozzle jet propulsor using gas or liquid of the environment for its operation. The propulsor comprises eight nozzles, which are arranged centrally-symmetrically and connected with each other through a system of channels, and pressure units in the channels for controlling the magnitude and direction of the pressure in the flow of the operating medium in the channel system. Also, each of the nozzles is adapted to control the direction of discharging the jet of the operating medium into the environment. Each of the nozzles is capable of both taking in the operating medium from the environment into the propulsor and discharging the operating medium from the propulsor into the environment—depending on the mode of operation of the propulsor at the moment.

The system of the propulsor channels comprises eight channels (further on referred to as active channels) with the pressure units, four intermediate channels, and a central channel. Each of the eight active channels with the pressure units is connected by one end thereof to one of the above-mentioned nozzles. All active channels with the pressure units are connected in twos by other ends thereof to thus form four joint connections of the active channels. To each of the joint connections, an intermediate channel is connected by one end thereof. By other ends thereof, the four intermediate channels are connected in twos to each other, to thus form two joint connections of the intermediate channels. The central channel is connected by two ends thereof to the two joint connection of the intermediate channels.

The proposed structure of the propulsor channels ensures minimization of internal loss and the highest efficacy of the propulsor for all cases where overall (total) length, width, and height of the propulsor are not equal. The lowering of internal loss in the flow channels of the propulsor as compared to the prototype is mainly due to shortening ways for operating medium flows along the channels in some of the operating modes of the propulsor, which results in the lowering of hydrodynamic (gas-dynamic) loss in the flows, as well as because of the straightening of the paths of the operating medium flows, i.e. the lowering of the sum turning angle of the operating medium flows in some of the operating modes of the propulsor, the straightening also contributing to the lowering of hydrodynamic (gas-dynamic) loss in the operating medium flows.

The pressure units in the active channels are made controllable and provide controlling the pressure in the operating medium flow in a respective channel in both directions—to a nozzle and from a nozzle alike. The nozzles are equipped with controllable deflectors of the direction of ejection of the operating medium jet. Depending on the mode of operation, the nozzles allow both ejection of the jet of the operating medium in the propulsor and intake of gas or liquid of the environment through a nozzle into the propulsor to be used as an operating medium.

In operation of the propulsor, it is provided due to the operation of the pressure units that equal amount of the operating medium (gas or liquid) is taken from the environment into the propulsor through one or several nozzles and same amount of the operating medium is ejected through another or several other nozzles back into the environment as directed jets. The speed (flowrate) of the jet ejection is defined by the operation of the propulsor pressure units, whereas the direction of ejection of the jet from each nozzle is set by a controllable deflector of the direction of ejection of the respective nozzle. The speed and direction of the jet define the value and direction (opposite to the direction of ejection) of thrust of the respective propulsor nozzle. Vector sum of forces of all nozzles working for ejection of the operating medium jet represents the overall thrust and overall thrust moment of the propulsor. Spatial symmetry of the propulsor nozzle locations, operational flexibility of each nozzle to work for both suction or ejection of the operating medium, and controlling the direction of the ejection of operating medium jets from each nozzle make it possible for the propulsor to simultaneously form a thrust and a thrust moment which are arbitrary by direction—in the full solid angle range—and by value thereof (up to the maximum which is defined structurally subject to the propulsor intended use). The propulsor is able to provide high speed of controlling these thrust parameters, and this results in the high level of controllability for the transportation facility equipped thereby.

The new configuration of the propulsor flow passages proposed in this application provides substantially different, as compared with the prototype, distribution and movement of the operating medium flows along the propulsor channels which lowers internal loss in the propulsor and ensures enhancing efficiency and/or efficacy of the proposed propulsor versus the prototype. Increasing efficacy of the propulsor at a given thrust lowers energy and fuel consumption. At a given topping power of the propulsor drive, it ensures a larger propulsor thrust. Bettering these parameters has a big practical bearing.

The efficacy increase is achieved through lowering internal hydrodynamic (gas-dynamic) loss of energy in the flows of operating medium as it moves through the system of the propulsor flow channels. The effect is attained due the use of a new channel structure. The total (summarized) effect of the loss lowering includes contributions of several different loss lowering effects, each of which results from using a "complex star" system of fluid channels in the proposed propulsor. Specificity of those different effects of loss lowering resulting from using the channel system of the proposed configuration will be discussed later in more detail.

When describing comparative efficacy of the prototype (the closest prior art) and the proposed propulsor, these two propulsors are compared on the like-for-like basis where possible, as far as technical parameters, other than structurally different channel systems, are concerned. This means that implied upon comparing the proposed propulsor and prototype are: (a) matching dimensions—overall length, width and height of the propulsor; (b) matching the space occupied by the propulsor within the body of a transport vehicle (this in practice being a parameter of comparableness of the characteristic section areas of the channel openings); (c) availability of completely identical pressure units, nozzles and deflectors for compared propulsors; (d) fluid channels of the prototype and proposed propulsor are designed to provide maximum efficacy for the configuration used. Since the propulsors have similar functionality, the efficacy of the prototype and proposed propulsor can be compared in identical modes of operation. The above comparison conditions are necessary and sufficient for a proper correlation.

All the loss-reducing factors to be discussed below occur for any properly comparable pair "prototype-proposed propulsor". The respective increase in the efficacy is expected for propulsors with any ratio between length, width and height, the exception being where the length, width and height of the proposed propulsor (and, accordingly, of the prototype) are equal to each other (the length is equal to the width and to the height) because in this case the proposed propulsor and prototype cease differing from one another in structure and have no advantages over one another. Providing the highest possible efficacy in the propulsor of this type where there is a substantial difference between the length, width and height thereof (that can be thought of, for example, for a propulsor which is prolate and flattened by height) is one of the main objects of the present invention. It is believed that this object is in demand (when using propulsors of this kind) for equipping transport vehicles to be used in liquid and gas environment, the vehicles having prolate and flattened body configuration. A form of triaxial ellipsoid (or close thereto) offers a non-limiting example of such a body.

Due to considerable complexity and the amount of computation, the present description provides no complete and rigorous calculation that would require considering a great deal (unlimited number) of configurations (ratios) and body size. Modes of operation discussed below as nonlimiting examples, which give the proposed propulsor the edge over the prototype, are presented to explain feasibility and workability of the propulsor, with no rigorous consideration of lessening loss versus the prototype. When describing further the operation of the propulsor, only some comments are made—to explain, for example, how flows pass by evidently shorter paths through the system of flow channels of the proposed apparatus. Such an approach follows from claiming just the propulsor, so methods of operation of the propulsor are only disclosed to the minimal extent required therefor.

The above-mentioned reducing of loss in the operating medium flows is achieved in the proposed propulsor by an aggregation of actions of several various factors, those factors resulting, as shown in the ensuing description, from using a modified system of flow channels. The factors causing the loss lessening can all act simultaneously or be present in any combination thereof, depending on specific modes of operation of the propulsor.

The gain in performance of the propulsor, as compared with the prototype, is caused by the following factors:

(A) In some of the operation modes of the proposed propulsor, flows of the operating medium in the flow channels thereof use shorter paths as compared with the prototype in the same operation mode. This is achieved due to the use of the "complex branched star" channel structure instead of a "simple star" in the prototype. At that, the flows of the operating medium move either avoiding the central channel of the propulsor or avoiding the central channel and some (or all) intermediate channels. Some non-limiting examples of these modes (regimes) will be discussed in detail later in the section "Operation of the propulsor". Such shorter paths for the operating medium flows, as compared with the prototype in similar regimes, lessen hydrodynamic loss of energy in the flows due to lesser hydrodynamic resistance, all other thins being equal (caeteris paribus), of shorter channels which results in enhancing propulsor efficacy versus the prototype. This efficacy enhancement is achieved owing to the use of the new system of fluid channels in the propulsor.

(B) Also, the proposed propulsor provides (in those regimes, where operating medium moves over the shorter paths) for the "straightened" paths—a lesser sum of flow turning angles (a lesser total angle where there are several turns for the flow) by contrast to the prototype in functionally similar regimes of operation thereof. Such "straightened" paths of flows of the operating medium, caeteris paribus, lessen energy loss in flows due to decreasing the total hydrodynamic resistance associated therewith. This also leads to enhancing the propulsor efficacy.

(C) A number of operating regimes of the proposed propulsor assume that flows of the operating medium move across the central and/or intermediate channels thereof (some of those regimes will be discussed in detail later in the section "Operation of the propulsor" as non-limiting examples). At that, each intermediate channel passes resultant flows of two end channels connected thereto. The channel system of the proposed propulsor allows for using intermediate channels having inner cross-sectional area (opening) equal, as a non-limiting example, to the sum of inner cross-sectional areas of two end channels. Such a design results in decreasing hydrodynamic resistance in the intermediate channels of the propulsor by passing a "double" flow through one channel of the summary inner cross-sectional area. This feature is impossible to realize in the prototype because it uses a "simple star" system of channels. Similarly, summary flows from each pair if the intermediate channels move through the central channel of the proposed propulsor. The proposed design allows for using the central channel having inner cross-sectional area equal to the sum of the inner cross-sectional areas of a pair of intermediate channels, resulting in the decreasing of hydrodynamic loss in the segment of the central channel. This feature is also impossible to realize in the prototype because it uses a "simple star" system of channels. Complete and rigorous calculations and computations of the above effect would be also of considerable volume and are not for that reason set forth in the current disclosure.

It was noted that the above-discussed factors (A), (B), and (C) of loss decreasing can show their worth—separately or in any combination thereof—in various regimes of operation of the propulsor.

IMPLEMENTATION OF THE INVENTION

Description of the Structure of the Propulsor

Figure 1:
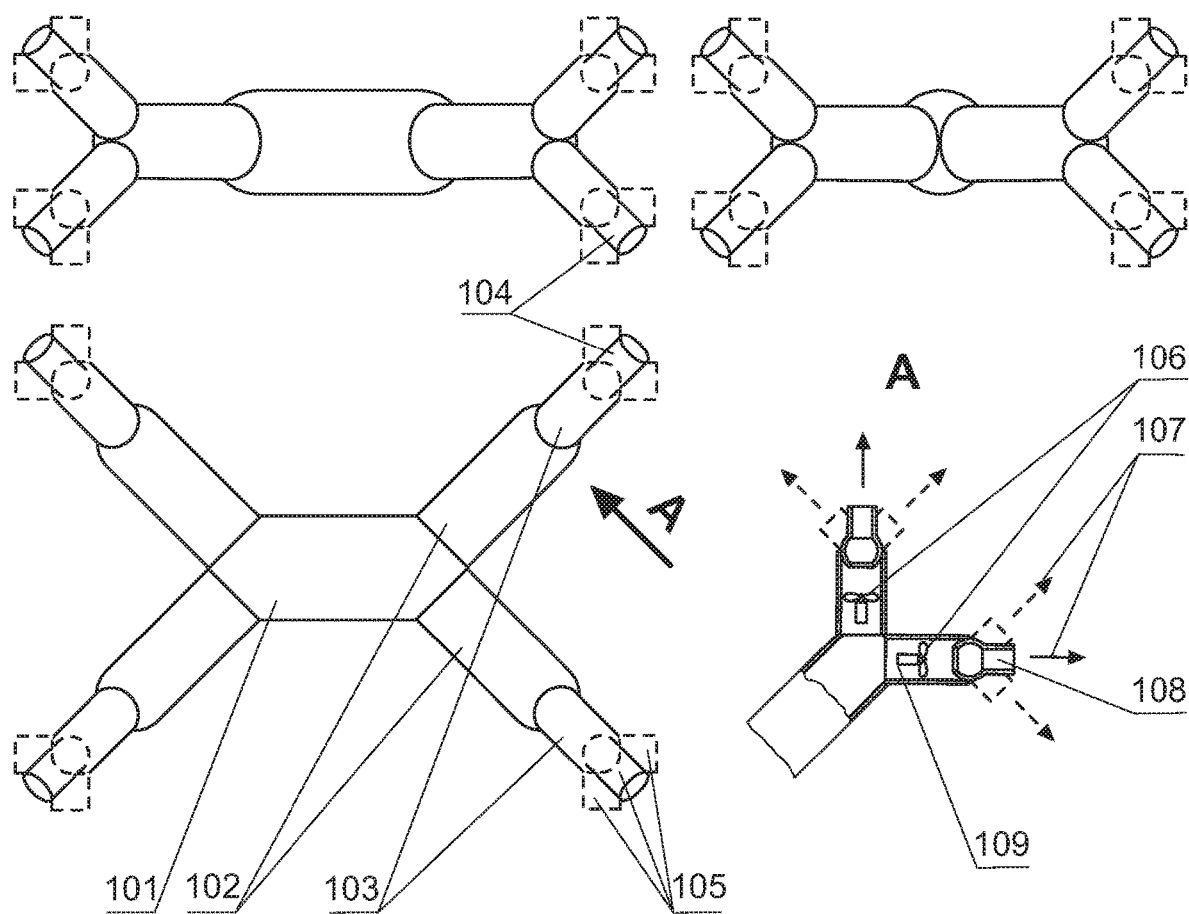
FIG. 1 shows the proposed propulsor in three views.

FIG. 1 presents a sketch of the propulsor shown in three views. The propulsor is equipped with eight nozzles 104 connected with each other by a system of channels 101, 102, and 103. Gas or liquid from the environment (not shown) the propulsor operates in serves a consumable operating medium therefor. Eight channels 103, further referred to as end channels or active channels, connected to the nozzles 104 are equipped with controllable reversible pressure units 106 which, to be definite and presenting a non-limiting example, are shown as impellers (for the gas) or ship propellers (for the liquid), each of the pressure units being connected to a power actuator 109. All the propulsor nozzles are equipped with vectoring units (deflectors) 108 which, to be definite and presenting a non-limiting example, are shown as deflectable pipes. The vectoring units control the discharge direction of a jet 107 from the nozzle 104 illustrated as dotted pipes in several fully positions 105. Changing the pressure direction in the pressure units 106 (reversing the pressure) makes it possible for each nozzle 104 to provide for both the operating medium jet discharge from the propulsor and gas or liquid intake from the environment into the propulsor for using as the propulsor operating medium.

Figure 2:
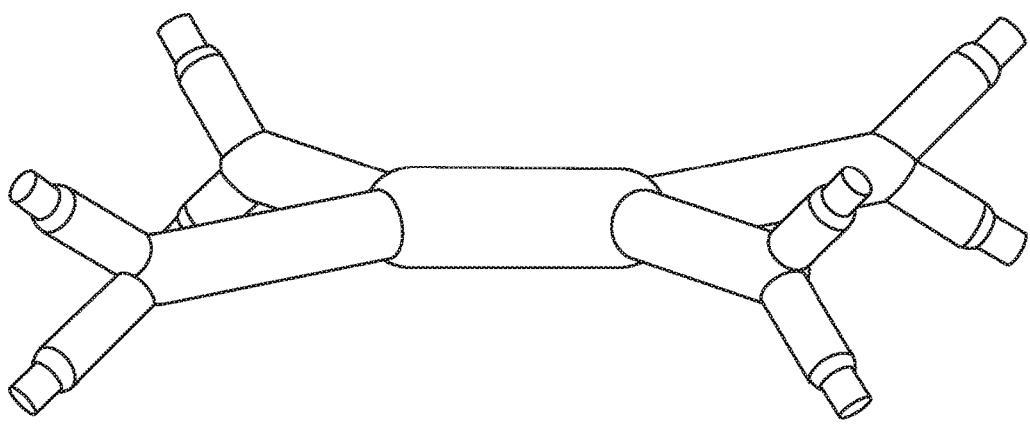
FIG. 2 presents a main view of the propulsor of the disclosure.

As shown in the FIGS. 1 and 2, the eight nozzles 104 are situated in the vertices of an imaginary parallelepiped (a non-limiting example). As illustrated by a view A of FIG. 1a, the active channel 103 is connected to a nozzle and is equipped by a pressure unit 106. Being reversible, each pressure unit 106 of the propulsor can control both the amount and direction of the pressure. Dotted lines 105 show, as a non-limiting example, the fully positions which the deflectors 108 of the jet 107 discharged from the nozzle 104 may be in.

It follows from FIG. 1, the active channels 103 are pairwise connected by other ends thereof to first ends of intermediate channels 102. Where the active and intermediate channels are connected, an unobstructed flow of the consumable operating medium (gas or liquid) between any channels is provided.

Also, the intermediate channels 102 are connected by other ends thereof to two ends of a central channel 101. Where the intermediate and central channels are connected, an unobstructed flow of the consumable operating medium (gas or liquid) between any channels is provided.

FIG. 2 depicts the main view of this propulsor. The view demonstrably shows a complex spatial configuration of the channels including a three-dimensional (i.e. not located in one plane) star, with the central channel added to the center of the star.

Figure 3:
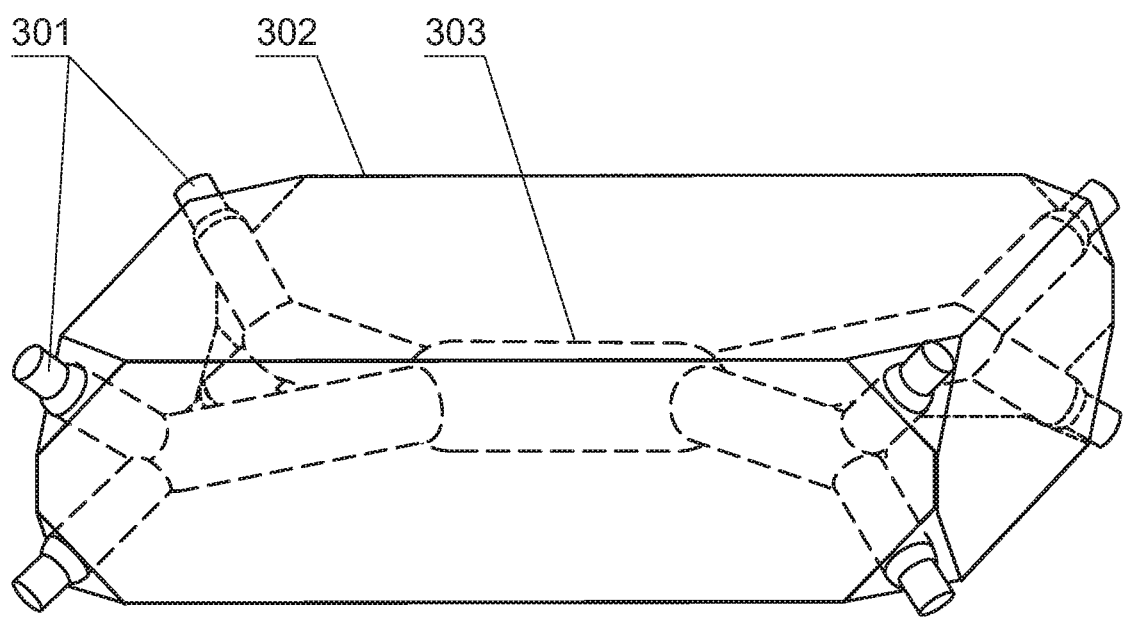
FIG. 3 depicts arranging the propulsor in the body of a transport vehicle.

FIG. 3 presents, as a non-limiting example, an arrangement of the propulsor 303 in a body 302 of a transport vehicle, the body looking like a parallelepiped with cut corners, the propulsor being placed inside the body, controlled nozzles being outside the body.

Like the prototype, the proposed propulsor possesses uniquely high level of transport vehicle controllability and ensures fast-response controlling of the thrust and thrust moment vectors in the full solid angle range. In doing so, the proposed structure of the propulsor channel connections secures substantially smaller, as compared with the prototype, internal loss in the propulsor. Thus, efficacy and efficiency of the propulsor are enhanced.

The described propulsor structure is most preferable for the use in transport vehicles moving in three-dimensional gas or liquid medium, specifically—as an unlimited example—in air or under water. The propulsor is intended for the use, as an unlimited example, within the body of transport vehicles. Non-limiting examples of such transport vehicles can be submarines for the liquid medium and dirigibles for the gas (air) medium.

Propulsor Units

Propulsor Nozzles

A practical, but non-limiting, example of mutual arrangement of propulsor nozzles 104 if placing same close to corners of an imaginary parallelepiped. Such an example is used for greater certainty in all the drawings illustrating the present disclosure.

The propulsor controlled nozzles ensure the controllable changing of the direction of discharge of the operating medium jet. Non-limiting examples of such nozzles are nozzles with inclinable extensions shown in view A of FIG. 1.

Pressure Units

The pressure units 106, shown in FIG. 1 provide, by creating a pressure difference, a flow movement of the operating medium in the propulsor. For the air (water) propellers 106 shown, as a non-limiting example, in FIG. 1, this is ensured by the use of controllable-pitch propeller blades and by the possibility of setting the negative incidence (pitch) of the blades, to thereby secure a controllable change of the propeller (water propeller) thrust value and direction. A propeller (water propeller) with a non-changing blade pitch and with the possibility of rotating in two opposite directions can serve another non-limiting example ensuring reversal of the head.

One more non-limiting example of a pressure unit with the head reversal is an aggregation of two or more above-described pressure units operating as an integral pressure unit.

It is understood throughout the present disclosure that pressure units 106 have a whichever power actuator conventionally shown in all figures similar to unit 109 in FIG. 1. Non-limiting examples of such power actuators are a separate motor connected to a propeller (water propeller) or a transmission connected to a propeller (water propeller) and ensuring the supply of energy and the operation of the pressure unit.

Propulsor Fluid Channels

A system of fluid channels in the propulsor is designed for connecting all the propulsor nozzles with each other and ensuring moving flows of the operating medium therethrough. The channels immediately connected to the nozzles are equipped with the pressure units. In their interconnection, the propulsor channels pattern "complex-branched spatial star with a central channel". The structure (configuration) of the channels is illustrated, for example, in FIG. 1. FIG. 3 shows, as a non-limiting example, the arrangement of the propulsor channels within the body of a transport vehicle.

Operation of the Propulsor

Operation of the propulsor applies the principle of creating thrust as a response to discharging a jet of operating medium, for example liquid or gas, from a nozzle.

A distinguishing operating characteristic of the proposed propulsor is the ability thereof to ensure controlling thrust (a total thrust vector of all nozzles) and thrust moment (a total thrust moment vector of all nozzles) in the full solid (spatial) angle range relative the propulsor itself.

To bring about the ability of such a control of the thrust and thrust moment, a possibility is realized in the propulsor to intake gas or liquid from environment through one or several propulsor nozzles and to use same as an operating medium. At the same time, the propulsor ensures the possibility of discharging a jet (jets) of the operating medium from another or several other nozzles to create a total thrust vector and total thrust moment vector required at a particular moment.

A mode of operation of each nozzle—for the intake of the operating medium from the environment or for the discharge of the operating medium jet back into the environment is mainly determined by the mode of operation of the pressure unit in the channel immediately connected to the nozzle, and—to a lesser extent—by the mode of operation of pressure units in other channels.

All the propulsor nozzles are equipped with units controlling the direction of discharge of the operating medium jet.

The proposed structure (arrangement) of the channels of the propulsor, modified as compared with the prototype, enhances the efficacy of the compulsory due to lesser internal loss in the propulsor.

The operation of the propulsor is described below by non-limiting examples illustrating how several modes of operation thereof are realized.

General principles of operation of the propulsor are described with a reference to FIG. 1. During the operation of the propulsor, gas or liquid comes from the environment into the propulsor through some (one or several) of eight nozzles 104 thereof, passes through channels 101, 102, 103 of the propulsor and is then discharged back into the environment as directed jets through other nozzles of the propulsor. Reacting forces resulting from the discharge of the jets of the operating medium form the total thrust of the propulsor and the total thrust moment (turning force) of the propulsor.

The intake of the operating medium into the propulsor, the movement of the operating medium through the channels, and the discharge of the operating medium through the nozzles are performed due to the operation of pressure units 106 in eight active channels 103 of the propulsor (the channels immediately adjacent to the eight nozzles 104).

The mode of operation of the nozzle 104 "for the intake of the operating medium from outside" is realized through a respective direction of the head of the pressure unit 106 in the active channel adjacent to this nozzle. The pressure unit 106 creates a head (a pressure difference) resulting in lowering the pressure in the nozzle which ensures inlet of the gas or liquid from the environment into the nozzle. As a result, the intake of gas or liquid from the environment is performed through the nozzle.

The mode of operation of the nozzle 104 "for the discharge of the jet" is realized through the work of the pressure unit 106 in the channel immediately adjacent to a respective nozzle 104, the pressure unit creating a head toward the nozzle. As this takes place, the deflector 108 controlling the direction of the jet discharge from the nozzle 104 ensures the required direction of the discharge of the jet. The resulting reactive force is directly related, by the magnitude thereof, to the intensity of the jet (namely, to the flow rate and the nozzle velocity), is opposite, by the direction thereof, to the direction of the discharge of the jet of the operating medium from the nozzle, and is applied to the body of the nozzle along the axis of the jet. The thrust vector of every nozzle can vary by value thereof from zero to a certain maximal value prescribed structurally and by direction thereof— within a certain solid angle which is also prescribed structurally.

In each particular moment of the operation of the propulsor, each of the nozzles 104 of the propulsor works either for the discharge of the jet of the operating medium from the propulsor or for the intake of the operating medium into the propulsor (except for the zero flow rate (stagnation point) through the nozzle). As this takes place, the intensity of the discharge of the operating medium, or the intensity of the intake thereof through a specific nozzle 104 at each particular moment can be controlled by the pressure unit 106 of the active channel 103 of the respective nozzle over a wide range from zero to a maximal intensity. Falling into this range is the stagnation point where the operating medium neither comes into, nor discharge from, the nozzle.

Thrust vectors for all the nozzles, working for the discharge of the operating medium, are summed according to known rules of adding vector values and form a total thrust vector of the propulsor and a total thrust moment vector.

The arrangement of the nozzles 104 relative to the whole propulsor at the corners of the imaginary parallelepiped, shown as a non-limiting example in FIG. 1 and other drawings, provides the possibility for the propulsor to form thrust vectors and thrust moment vectors in any spatial direction, i.e. in the range of a full solid angle.

The thrust moment of the propulsor is a propulsor turning force around an imaginary axis which is actually oriented in space randomly. In the language of the vector representation of force moments, where a force moment is represented by a vector formed according to the known right-hand rule, the propulsor secures forming a force moment vector in any direction, i.e. in the range of a full solid angle.

Generally, the movement of the operating medium through the propulsor channels is described by a rather complicated interaction complex since, in operation, each pressure unit influences flows of the operating medium in all propulsor channels. The examples of the operation of the propulsor described in the present disclosure outline "in a first approximation' main and essential phenomena occurring in the propulsor, without mentioning all (of lower value) interactions. In presenting this way, all the explanations set forth in the description of the propulsor operation remain correct, notwithstanding a simplified character thereof.

The design of the propulsor offers the possibility to form at any moment and simultaneously a thrust vector in any direction and thrust moment vector in any direction. With that, it becomes possible to use, when required, the whole available power capacity for either of the above two tasks because both maximal thrust and maximal thrust moment are formed where all pressure units 106 are at full operation. In proceeding so, the available power capacity can be, and must be, shared by the task of forming thrust and the task of forming thrust moment as appropriate for the current task of the propulsor and the whole transport vehicle. Generally, the realizing of the propulsor mode of operation at each moment is always a two partial modes superposition—forming thrust and forming thrust moment—made reasonably and in the optimal way.

In operation of the propulsor, there is always selected a mode where one or several nozzles 104 perform the discharge of the operating medium, whereas another or several other nozzles 104 perform taking the operating medium in the propulsor. Eight nozzles of the propulsor offer a large set of such combinations. Among those combinations, the most intensive are those relating to the modes where four nozzles work for taking the operating medium in, whereas four other nozzles work for discharging the operating medium, forming a currently required combination of total thrust and total thrust moment (turning force). Since any nozzle 104 of the proposed propulsor can be used for both taking the operating medium from outside and for discharging the operating medium outside, there exist many (actually, unlimited number of) combinations forming the required total thrust vectors and thrust moment vectors.

Examples of Operating Modes of the Propulsor.

Figure 4:
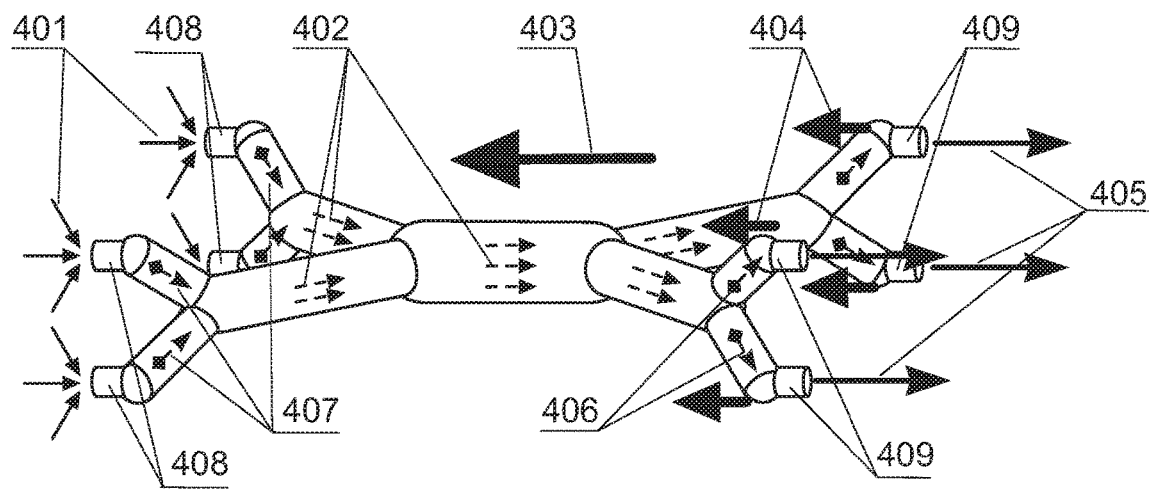
FIGS. 4-11 illustrate various regimes of operation of the propulsor to create thrust in the directions indicated.

Shown in FIG. 4 as a non-limiting example is the most common (in which all the propulsor units are involved) mode of operation of the propulsor. Triple arrows 401 show the intake, via respective nozzles, of gas or liquid from the surrounding environment to be used as the operating medium. This results from rarefaction created in respective channels when pressure units work for suction, which is shown conventionally by dotted arrows 407 with diamonds. Dotted arrows 402 illustrate the movement of the operating medium through the propulsor channels. A big bold arrow 403 shows the direction "to the left" of the total propulsor thrust in this mode of operation. Short thick arrows 404 show thrust of the respective nozzle, which thrust in turn appears as a reaction to the discharge of the jet of the operating medium from the nozzle in the directions shown by arrows 405. The thrust in the direction pointed by the arrow 403 is a vector sum of thrust forces 404 of four right nozzles of the propulsor that are equal in terms of direction and magnitude.

The required thrust is formed due to the shown modes of operation of the pressure units working for the suction (shown by arrows 407) through nozzles 408, and working for the discharge (shown by arrows 406) of the operating medium through nozzles 409 of the propulsor, the pressure units defining the direction 405 of the discharge of the jets of the operating medium and forming the thrust 404 of each of these nozzles.

This mode of operation of the propulsor secures, as a non-limiting example, a direct motion of the transport vehicle.

Figure 5:
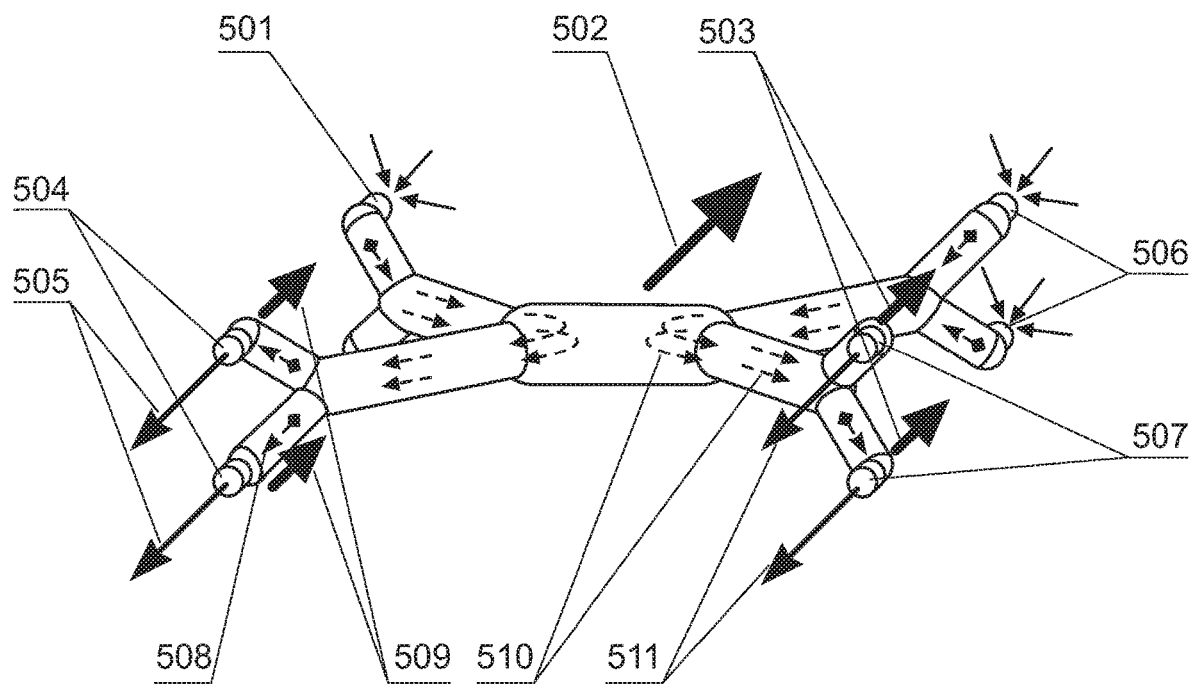

Shown in FIG. 5 as a non-limiting example is a propulsor mode of operation forming thrust in the direction pointed by arrow 502. Nozzles 504 and 507 of the propulsor discharge jets of the operating medium in the direction designated by arrows 505 and 511, whereby thrust 509 and 503 of the nozzles and total thrust in the direction shown by the arrow 502 are formed. The intake (suction) of the operating medium into the propulsor is performed through four nozzles 501 (the second nozzle 501 is not visible in the drawing) and 506. Dotted arrows 510 show flows of the operating medium through the propulsor channels, and dotted arrows 508 with diamonds illustrate the direction of the head in the respective pressure units.

This mode of operation of the propulsor secures, as a non-limiting example, a sideward motion of the transport vehicle.

Figure 6:
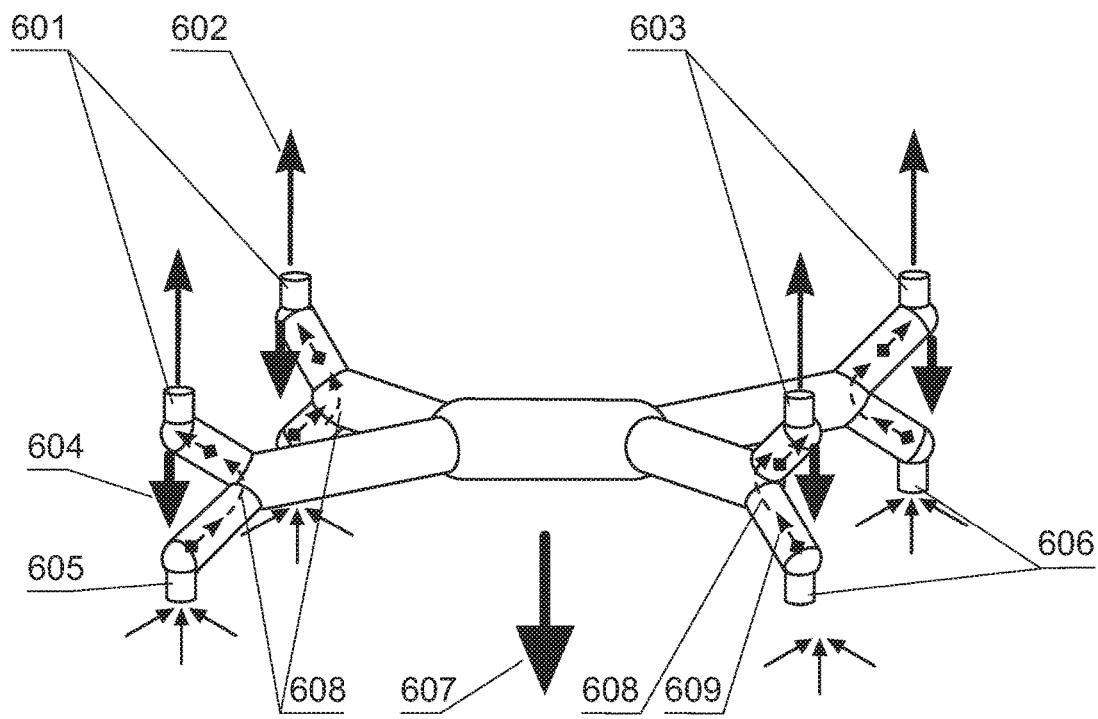

FIG. 6 illustrates, as a nonlimiting example, forming thrust in the direction shown by arrow 607, four nozzles 605 (the second nozzle 605 being invisible in the drawing) and 606 working to suck the operating medium from the surrounding environment, and nozzles 601, 603 working to discharge the operating medium jets in the direction 602. Dotted arrows 608 show paths (very short for the case) of the operating medium through the propulsor channels for this mode, whereas dotted arrows 609 with diamonds show, similar to that in other drawings, the direction of the head created by pressure units in the respective channels of the propulsor. The thrust 604 formed by each nozzle presents, when summed up, the total thrust 607 of the propulsor.

This mode of operation of the propulsor secures, as a non-limiting example, a downward motion of the transport vehicle.

Figure 7:
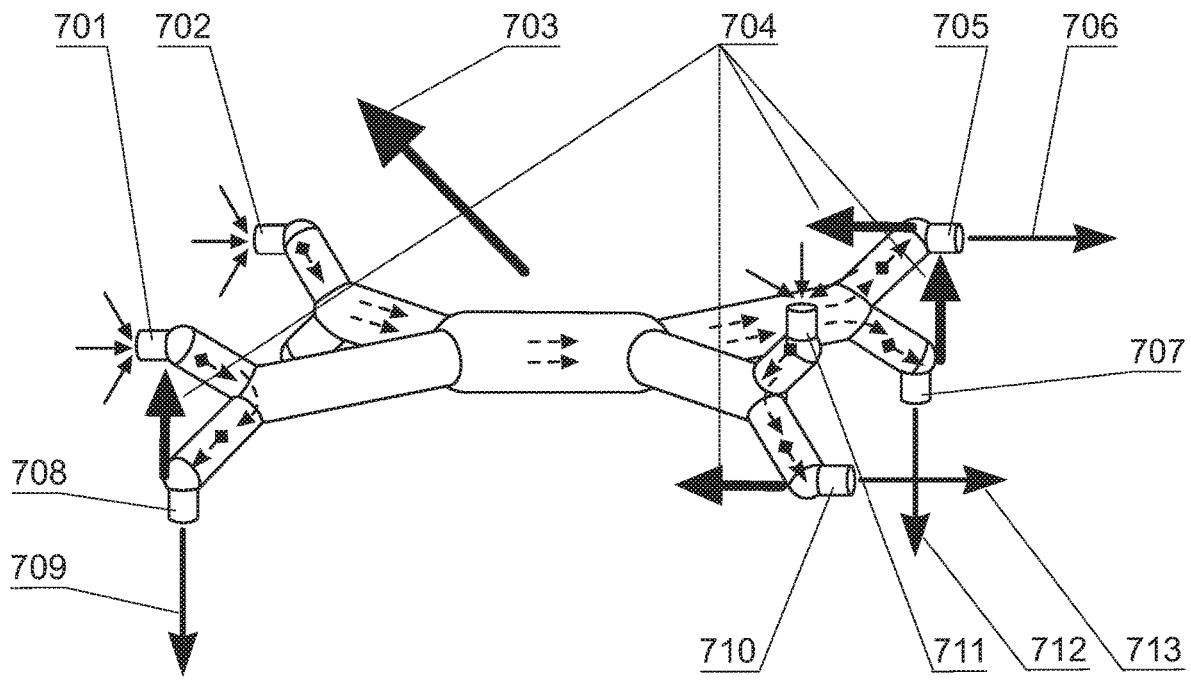

Shown in FIG. 7 as a non-limiting example is the propulsor operation mode where thrust is formed in the direction shown by arrow 703, nozzles 701, 702, 711 working to suck the operating medium from the surrounding environment, nozzles 705, 707, 708, and 710 working to discharge the operating medium in the directions designated by arrows 706, 709, 712, 713. The total thrust in the direction shown by the arrow 703 is secured as a thrust vector sum 704 of the four nozzles 705, 707, 708, and 710. Dotted arrows show paths of the operating medium through the propulsor channels for this mode, whereas dotted arrows with diamonds show the direction of the head created by respective pressure units in the propulsor channels.

This mode of operation of the propulsor secures, as a non-limiting example, a front-and-upward motion of the transport vehicle.

Figure 8:
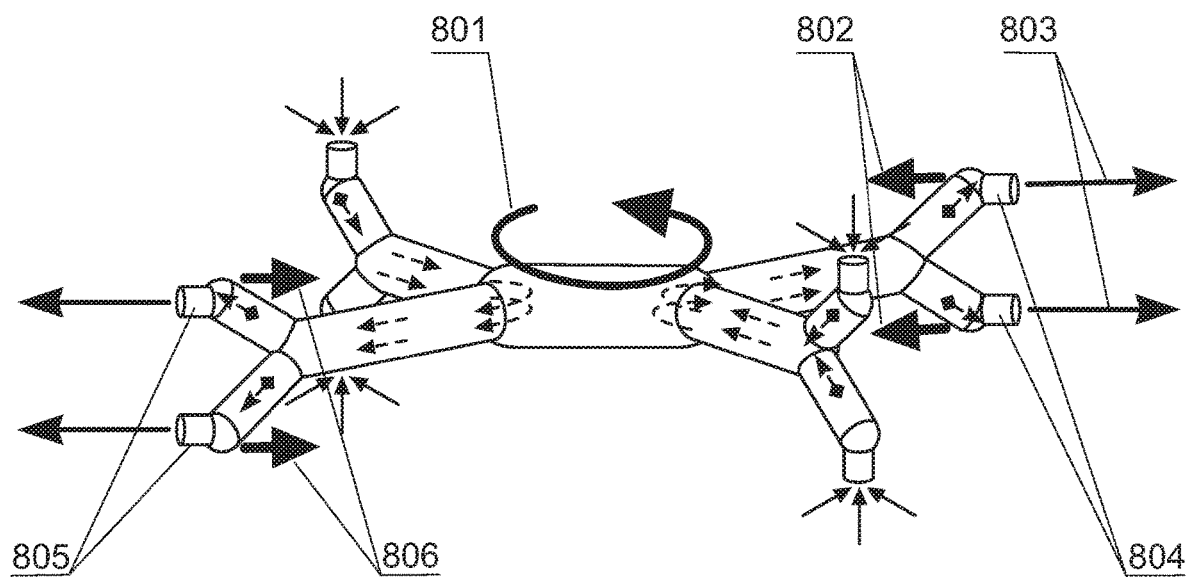

FIG. 8 illustrates, as a non-limiting example, the propulsor mode of operation creating a thrust moment (a turning force) in the direction shown by a circular arrow 801 (counterclockwise, about the axis of yaw of the propulsor). The thrust moment for this mode is formed by a total thrust (short arrows 802 and 806) of two pairs of nozzles 804 and 805 discharging jets of the operating medium in the directions designated by long arrows 803. It is understood that the thrust vectors (shown as arrow pairs 802 and 803) of the nozzles are parallel in space and equal to each other by magnitude, thus securing a zero-total thrust of the propulsor with a significantly non-zero thrust moment thereof.

This mode of operation of the propulsor offers, as a non-limiting example, an on-the-spot turn of the transport vehicle.

Figure 9:
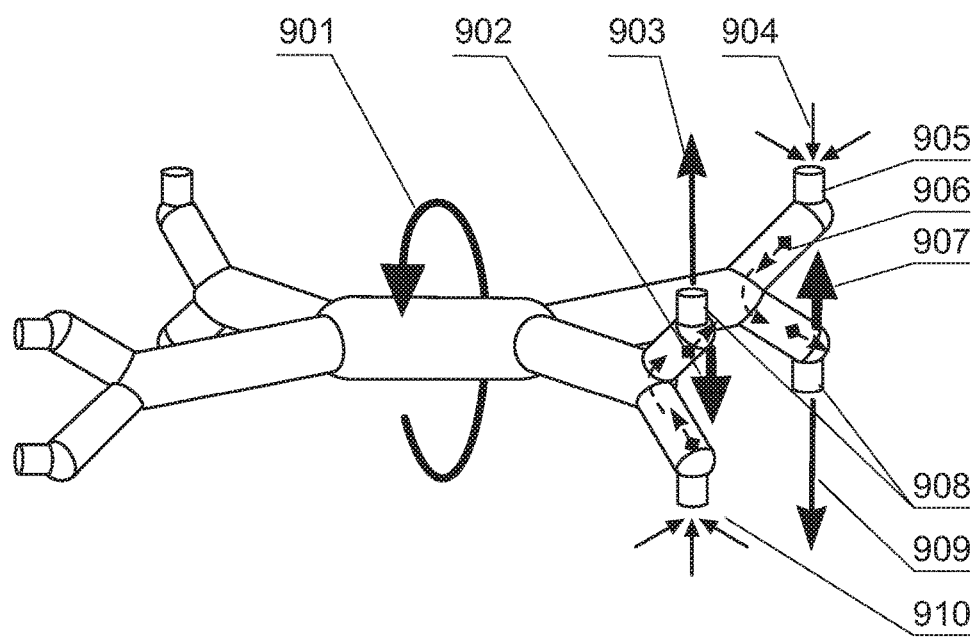

Shown in FIG. 9 as a non-limiting example is the propulsor mode of operation providing thrust moment in the direction of a circular arrow 901 (about the longitudinal (roll) axis of the propulsor) due to the operation of two nozzles 908 discharging jets of the operating medium in the directions defined by arrows 903 and 909, thus creating thrust 902 and 907. Two nozzles work for suction providing intake of the operating medium from the environment into the propulsor as indicated by arrows 904. It is understood that the thrust vectors of the nozzles are parallel in space and equal to each other by magnitude, thus securing a zero-total thrust of the propulsor with a substantially non-zero thrust moment thereof. Dotted arrows 906 with diamonds show the operation direction of the pressure units of the active channels in this mode of operation of the propulsor. Other channels, nozzles and pressure units are not involved in the mode shown, there is no movement of the operating medium therethrough (a zero flow).

This mode of operation of the propulsor offers, as a non-limiting example, rolling of the transport vehicle or compensating of the rolling caused by an external action.

Figure 10:
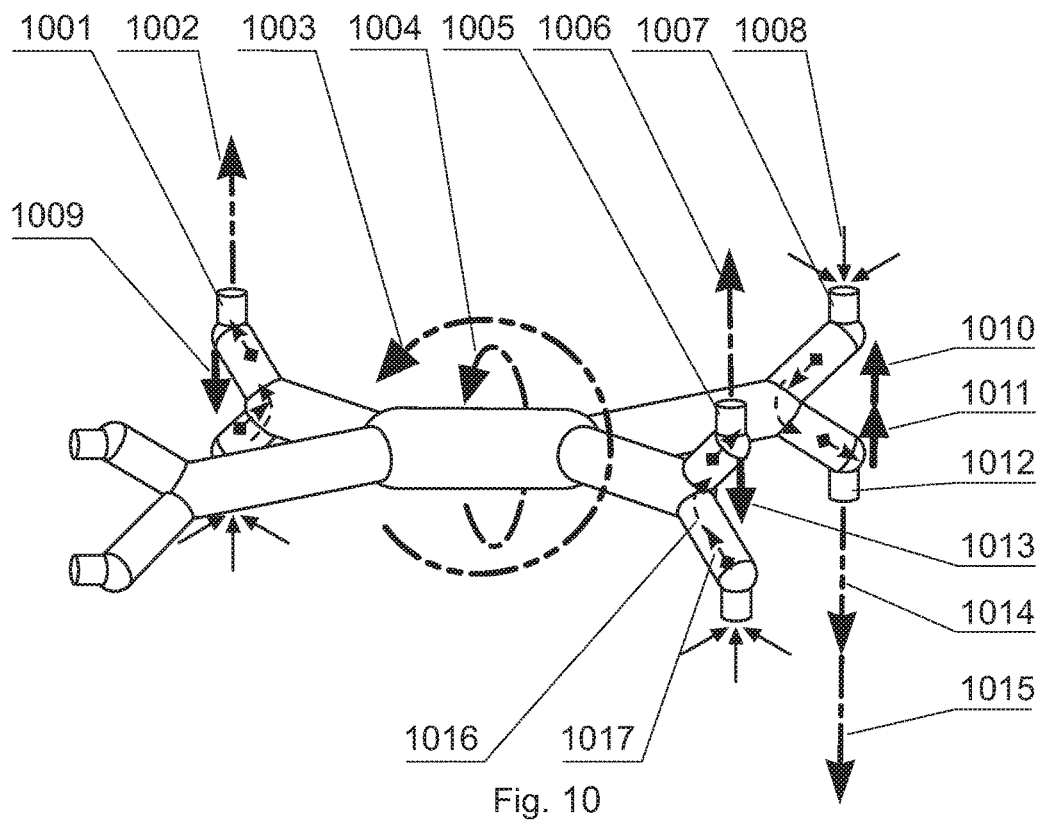

Depicted in FIG. 10 as a non-limiting example is a more complex mode of operation where forming two thrust moments in the directions indicated by circular arrows 1003 and 1004 takes place simultaneously.

In this drawing, some vectors (such as 1014 and 1015) are illustrated the way that vividly demonstrates them as a vector sum. This means the following. Consumption of the operating medium (the direction and magnitude of the consumption) from the nozzle 1012, shown by separate vectors 1014 and 1015, is in fact (in the mode depicted in this drawing) a total summary consumption, the magnitude and direction thereof being presented by a vector sum, a double (summary) arrow "1014+1015". Each of those partial consumptions creates a respective thrust. This is shown by two thrust vectors (arrows 1010 and 1011) which are summed vectorially and thus create a total summary nozzle thrust indicated by a double arrow "1010+1011". De facto, the nozzle would certainly discharge one (summary) jet and forms one (summary) thrust. Such a resolution of the summary consumption and respective summary thrust of one nozzle (1012) into components is set forth in FIG. 10 to vividly show and elaborate further on the way this one nozzle (in the mode under consideration) works to simultaneously (summarily) provide the formation of two different thrust moments in cooperation with two other nozzles (1001 and 1005). As this takes place, the operating medium jet 1002 from the nozzle 1001 forms thrust 1009 of this nozzle, and the operating medium jet 1006 from the nozzle 1005 forms thrust 1013. Such vector representation is fully faithful mathematically and physically.

Within the limits of such representation, it is clear from FIG. 10 that a force couple 1011 and 1009 (nozzles 1012 and 1001, respectively) creates a force moment tending to turn the propulsor in the direction of the circular arrow 1003. If the above-mentioned force vector couple is parallel to each other, multidirectional, and the forces are equal to each other, the summary thrust created thereby is equal to zero, whereas the summary force moment has a significant value. In this case, the synchronous varying of these forces (in an unchanged direction) provides regulating the magnitude of the created moment from zero to a certain maximum.

Same operational procedure is applicable to a consumption couple 1015 and 1006 and to a respective force couple 1010 and 1013 emerging as a response to the discharge of the mentioned consumption of the operating medium from the nozzles. Similarly, the above couple of forces, providing they are parallel, multidirectional and equal by magnitude, forms thrust moment of significant value and forms no summary thrust (their thrust cancels out and equal to zero). It is possible, when synchronously regulating consumption 1015 and 1006, to independently vary the thrust moment value in the direction of the circular arrow 1004.

The intake of the operating medium from outside into the propulsor is illustrated by triple arrows 1008 next to respective nozzles 1007. The paths of movement of the operating medium through the propulsor channels in this mode are shown by dotted arrows 1016. The direction of head in pressure units of the channels are indicated by dotted arrows 1017 with diamonds.

This mode of operation of the propulsor offers, as a non-limiting example, simultaneous counteraction with regard to roll and trim caused by an external action.

Figure 11:
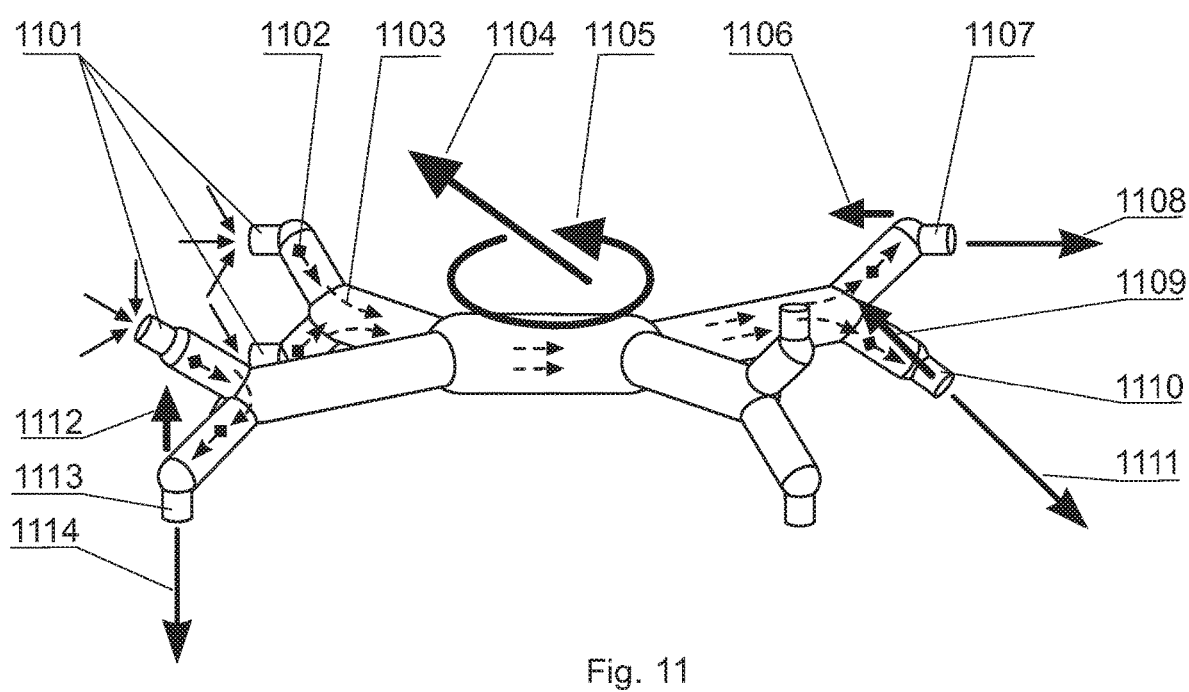

A mode of operation of the propulsor providing simultaneously thrust in the direction shown by arrow 1104 and thrust moment in the direction indicated by arrow 1105 is illustrated, as a non-limiting example, by FIG. 11. Nozzles 1101 provide intake of the operating medium from the outside environment into the propulsor. Dotted arrows 1103 show the paths of movement of the operating medium, and dotted arrows 1102 with diamonds depict the direction of operation of pressure units. Nozzles 1107, 1110, and 1113 work for the discharge of the operating medium and form required discharge jet directions 1108, 1111, and 1114. These nozzles form respective thrust forces 1106, 1109, and 1112. In this mode, vector 1104 of the force of thrust of the propulsor as a whole is a vector sum of the above nozzle thrust vectors, whereas the thrust moment of the propulsor as a whole (indicated by circular arrow 1105) is a sum (vectorial) of force moments of nozzles (not shown).

This mode of operation of the propulsor can be used, as a non-limiting example, in a situation of a vertical take-off of an air transport vehicle where the propulsor simultaneously provides climbing, building up speed, and getting the transport vehicle on the prescribed course.

What is claimed is:

1. A jet propulsor using gas or liquid of the environment the propulsor is in as an operating medium, the propulsor comprising eight nozzles, a plurality of channels interconnecting the nozzles, and reversible pressure units arranged in the channels for controlling a magnitude and a direction of a head in a flow of the operating medium in the channel, each of the nozzles being adapted to control a direction of a discharge of a jet of the operating medium and to provide an intake of the operating medium from the environment into the propulsor, as well as a discharge of the operating medium from the propulsor into the environment, wherein the plurality of channels comprises eight active channels equipped with the pressure units, four intermediate channels, and a central channel, each of the eight active channels with the pressure units therein is connected by one end thereof to one of the nozzles, all active channels with the pressure units therein are pairwise connected to each other by other ends thereof thus forming four connecting nodes of the active channels, each one of the intermediate channels is connected by one end thereof to a respective connecting node of the active channels, the four intermediate channels are pairwise connected to each other by other ends thereof thus forming two connecting nodes of the intermediate channels, and the central channel is connected by ends thereof to the two connecting nodes of the intermediate channels.

* * * * *